United States Patent
Huang

(10) Patent No.: US 12,418,506 B2
(45) Date of Patent: Sep. 16, 2025

(54) AUTOMATIC DETECTION AND NETWORK CONSTRUCTION METHOD AND EQUIPMENT BASED ON IPV6 PROTOCOL

(71) Applicant: D-LINK CORPORATION, Taipei (TW)

(72) Inventor: Hao-Chin Huang, Taipei (TW)

(73) Assignee: D-Link Corporation, Taipei (TW)

( * ) Notice: Subject to any disclaimer, the term of this patent is extended or adjusted under 35 U.S.C. 154(b) by 48 days.

(21) Appl. No.: 18/498,307

(22) Filed: Oct. 31, 2023

(65) Prior Publication Data
US 2025/0126093 A1    Apr. 17, 2025

(30) Foreign Application Priority Data
Oct. 11, 2023    (TW) .................................. 112138752

(51) Int. Cl.
| | |
|---|---|
| G06F 15/16 | (2006.01) |
| H04L 61/5014 | (2022.01) |
| H04L 61/5038 | (2022.01) |
| H04L 101/659 | (2022.01) |

(52) U.S. Cl.
CPC ...... H04L 61/5014 (2022.05); H04L 61/5038 (2022.05); *H04L 2101/659* (2022.05)

(58) Field of Classification Search
CPC ............. H04L 61/5014; H04L 61/5038; H04L 2101/659
USPC ........................................................ 709/245
See application file for complete search history.

(56) References Cited

U.S. PATENT DOCUMENTS

| | | | | |
|---|---|---|---|---|
| 7,633,948 B2 * | 12/2009 | Yokomitsu | .......... | H04L 61/5061 709/227 |
| 8,046,577 B2 * | 10/2011 | Henry | .................... | H04L 63/061 713/151 |
| 8,161,148 B2 * | 4/2012 | Tamura | ............... | H04L 61/5014 709/225 |
| 8,281,015 B2 * | 10/2012 | Jia | ........................ | H04L 12/2859 709/227 |
| 8,400,943 B2 * | 3/2013 | Dec | ..................... | H04L 61/5014 370/467 |
| 9,386,047 B2 * | 7/2016 | Wang | .................. | H04L 65/1069 |
| 9,781,234 B2 * | 10/2017 | Inada | .................. | H04L 12/4633 |
| 10,601,670 B2 * | 3/2020 | He | ....................... | H04L 41/0806 |
| 11,395,143 B2 * | 7/2022 | Yu | ......................... | H04L 63/083 |

(Continued)

*Primary Examiner* — Moustafa M Meky
(74) *Attorney, Agent, or Firm* — Rosenberg, Klein & Lee

(57) ABSTRACT

The present invention provides an automatic detection and network construction method based on the IPv6 protocol and an apparatus thereof, in which a user activates an auxiliary wizard program to determine whether the current connection to the Internet is a PPPoE protocol, and then carries out subsequent DHCPv6 communication protocols for PPPoE or IPoE environments to complete the construction of an IPv6 network and to obtain the required additional DHCPv6 information. In order to avoid the waste of IPv6 prefixes, the present invention also provides a method of hierarchically distributing prefixes through DHCP-PD. Finally, by obtaining the DHCPv6 additional information and the search method of PREF64, the appropriate IPv4 transition mechanism can be automatically determined and established. The present invention can not only significantly reduce the technical threshold for users to set up IPv6, but also complete the construction of the IPv6 network.

11 Claims, 1 Drawing Sheet

(56) References Cited

U.S. PATENT DOCUMENTS

| | | | | |
|---|---|---|---|---|
| 2002/0019875 | A1* | 2/2002 | Garrett | H04L 67/51 |
| | | | | 709/230 |
| 2005/0041596 | A1* | 2/2005 | Yokomitsu | H04L 61/2514 |
| | | | | 370/252 |
| 2005/0190775 | A1* | 9/2005 | Tonnby | H04L 12/4645 |
| | | | | 370/401 |
| 2008/0162702 | A1* | 7/2008 | Jia | H04L 12/2881 |
| | | | | 709/227 |
| 2010/0202321 | A1* | 8/2010 | Dec | H04L 61/251 |
| | | | | 370/254 |
| 2013/0227155 | A1* | 8/2013 | Dec | H04L 67/14 |
| | | | | 709/228 |
| 2013/0268686 | A1* | 10/2013 | Wang | H04L 61/5014 |
| | | | | 709/228 |
| 2014/0215034 | A1* | 7/2014 | Chen | H04L 61/5014 |
| | | | | 709/221 |
| 2015/0222734 | A1* | 8/2015 | Inada | H04L 12/4633 |
| | | | | 370/315 |
| 2018/0248763 | A1* | 8/2018 | He | H04L 43/12 |
| 2020/0007543 | A1* | 1/2020 | Yu | H04L 63/083 |
| 2023/0164212 | A1* | 5/2023 | Zhu | H04L 61/5014 |

\* cited by examiner

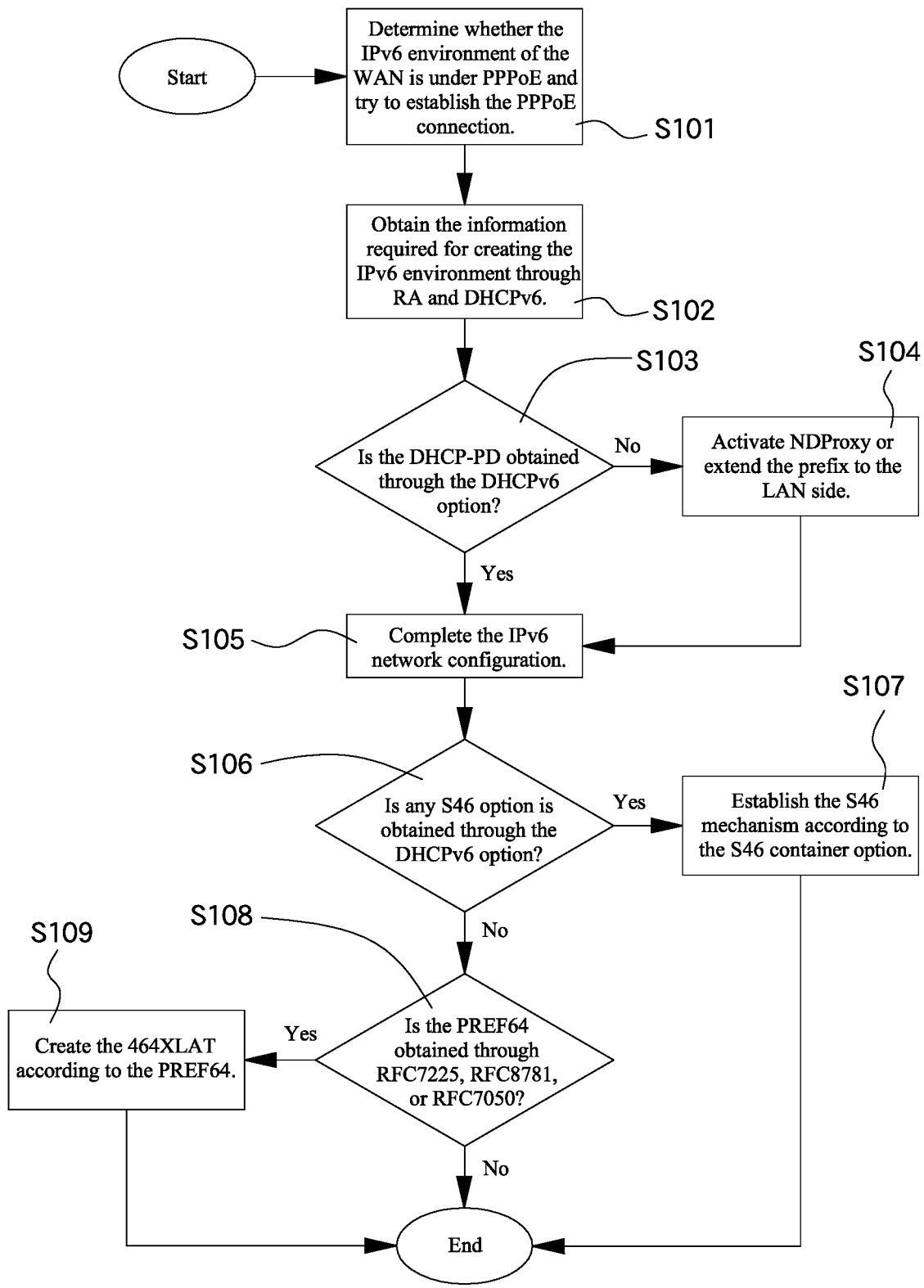

AUTOMATIC DETECTION AND NETWORK CONSTRUCTION METHOD AND EQUIPMENT BASED ON IPV6 PROTOCOL

BACKGROUND

Technical Field

The present disclosure relates to an automatic detection and network construction method and equipment based on the IPv6 protocol. The disclosure relates particularly to the automatic detection and network construction method capable of determining whether the protocol of current connection to the Internet is PPPoE and then carrying out a subsequent DHCPv6 communication protocol for the PPPoE or IPoE environment, and automatically determining and establishing a suitable IPv4 transition mechanism by means of DHCP-PD hierarchical distribution prefixes, or by obtaining additional information of DHCPv6 and a search of PREF64.

Description of Related Art

As Internet Protocol Version 4 (IPv4) is unable to meet the huge demand for IP addresses on the Internet due to insufficient addressing space, the implementation of the new-generation Internet Protocol Version 6 (IPv6) is already imperative. Most of the IPv6 configurations on customer premise equipment (CPE) must be configured by users, and different Internet service providers require different IPv6 environment settings. In addition, users are not very familiar with the IPv6, thus substantially increasing the technical threshold or entry barrier of using IPv6, as well as affecting the popularity of IPv6 in the present network environment.

In the IPv6 single protocol mode, applications programs originally only supporting IPv4 will not work properly, so that RFC8585 proposes an IPv4 transition mechanism of IPv4 as a Service (IPv4aaS), where IPv4 addresses are encapsulated or converted first, and then transmitted and communicated through IPv6. However, this transition mechanism comes with various different types and high technical threshold, thus making it different for user to configure and operate.

In view of the aforementioned drawbacks, the inventor of this disclosure further conducted extensive research on the automatic detection and network construction of the IPv6 protocol, in hope of overcoming the drawbacks of the related art, and finally provided the present disclosure.

SUMMARY

The objective of the present disclosure is to overcome the drawbacks of the related art and achieve the aforementioned objectives by providing an automatic detection and network construction method based on the IPv6 protocol, and the method is loaded by a system that carries out the steps of: sending an activation packet from a Wide Area Network (WAN) side of a customer premise equipment, recognizing that an Internet service provider provides a PPPoE line upon the receipt of a response packet, and directing a user to input the connection information of PPPoE to establish a PPPoE connection, and attempt to make a handshake of an IPv6 Control Protocol (IPV6CP) with a PPPoE server of the Internet service provider; exchanging a configuration request of the IPV6CP with the PPPoE server through the PPPoE connection established by the customer premise equipment; and creating an interface identifier required by a link-local address upon the receipt of a PPPoE server acknowledgement response, or determining that the current IPv6 environment is under IPOE when no PPPoE server response or a rejection is received.

The automatic detection and network construction method based on the IPv6 protocol further includes the step of: checking whether a DHCPv6 Prefix Delegation (DHCP-PD) length obtained by a DHCPv6 server of the Internet service provider is smaller than or equal to 64; directly distributing the prefix of a network gateway provided by a router advertisement (RA) to a LAN side if the DHCP-PD length is greater than 64 or cannot be obtained and the WAN side is under a PPPoE environment, so that the user can generate an IPv6 address; or letting a client router activate a Neighbor Discovery Proxy (ND Proxy) if the WAN side is under an IPoE environment, so that the LAN side and the WAN side can share the prefix provided by the router advertisement (RA).

The automatic detection and network construction method based on the IPv6 protocol further includes: checking whether the DHCP-PD length obtained by the DHCPv6 server of the Internet service provider is smaller than or equal to 64, and executing a distribution process accordingly; and providing a prefix with a DHCP-PD length equal to 64 to the LAN user in the distribution process if the prefix length of the DHCP-PD is equal to 64; or reserving two prefixes with a length equal to 64 to the LAN user and LAN side guest user respectively in the distribution process if the prefix length of the DHCP-PD is smaller than 64.

The automatic detection and network construction method based on the IPv6 protocol further includes: providing the prefix length of the remaining prefix distributed to the LAN user router, based on the following Table 1 of the DHCP-PD to the customer premise equipment of the LAN after the distribution process, if the prefix length of the DHCP-PD is smaller than 63, so that the LAN user of the customer premise equipment can obtain the IPv6 address;

TABLE 1

| Prefix length obtained from the network provider: N | Prefix length distributed to LAN side customer premise equipment: X |
|---|---|
| N ≤ 56 | X = (N + 4) |
| 57 ≤ N ≤ 59 | X = (N + 3) |
| 60 ≤ N ≤ 61 | X = (N + 2) |
| N = 62 | X = 63 |
| N ≥ 63 | None. |

The automatic detection and network construction method based on the IPv6 protocol further includes: a prefix distribution process, and the prefix distribution process includes the steps of: defining the customer premise equipment as a parent customer premise equipment of the prefix, after the child customer premise equipment of the LAN side obtains the DHCP-PD from the parent customer premise equipment, creating a routing for the child customer premise equipment by the parent customer premise equipment, pointing the distributed prefix to the child customer premise equipment, and releasing the prefix at the child customer premise equipment, or deleting the routing when the prefix expires.

In the automatic detection and network construction method based on the IPv6 protocol, the step of the prefix distribution process further includes: defining the child customer premise equipment as the parent customer premise equipment of the prefix, if the prefix of the DHCP-PD obtained by the child customer premise equipment is smaller than 63; and repeating the prefix distribution process, until the DHCP-PD prefix of the child customer premise equipment is greater than or equal to 63.

The automatic detection and network construction method based on the IPv6 protocol further includes the steps of: collecting a S46 option of the DHCPv6 by the DHCPv6 server of the Internet service provider; deciding to create a priority order of a S46 mechanism according to a S46 priority option; finding out the highest priority and the S46 mechanism existed in a legitimate S46 container option; and attempting to obtain a PREF64 and establish a connection to a 464XLAT, if the S46 mechanism cannot be created.

In the automatic detection and network construction method based on the IPv6 protocol, when the S46 mechanism cannot be created, the PREF64 is found and obtained according to the sequence of a Port Control Protocol (RFC7225), a Router Advertisements Option (RFC8781) and an IPv6 Address Synthesis (RFC7050).

In the automatic detection and network construction method based on the IPv6 protocol, the system executes the steps interactively, automatically, or semi-automatically through an auxiliary wizard program.

An automatic detection and network construction equipment based on IPv6 protocol includes: a processor and at least one storage device, the storage device is provided for storing an instruction; and the processor is provided for executing the instruction to implement the automatic detection and network construction method based on the IPv6 protocol.

In summation of the description and configuration above, it is obvious that the present disclosure has the advantages and effects as described in details below: the present disclosure is capable of establishing an auxiliary wizard program to allow the customer premise equipment to accomplish the fast detection and construction of the IPv6 environment, creating an IPv4 as a service (IPv4aaS) architecture according to the DHCPv6 setting or the RA setting of the Internet service provider, and adopting the technique of packeting the IPv4 or converting it into IPv6, so that the application program only supporting the IPv4 protocol can also be transmitted through the IPv6 network, thus lowering the technical threshold for users to establish the IPv6, improving users' experience, and increasing the popularity of the IPv6.

BRIEF DESCRIPTION OF THE DRAWING

The FIGURE is a flow chart of this disclosure.

DESCRIPTION OF THE EMBODIMENTS

The technical characteristics of the present disclosure will become apparent in the following detailed description of the preferred embodiment with reference to the accompanying drawings.

With reference to the FIGURE for the flow chart of an automatic detection and network construction method based on the IPv6 protocol of the present disclosure, the method is loaded into a system to execute the following procedure, and the system of the present disclosure is a functional program or a device, which includes a processor and at least one storage device, the storage device is provided for storing at least one instruction which can be executed by the processor of the equipment to carry out the required steps. Therefore, it is understood that the equipment can be computers or wireless base stations, such as: routing devices, wireless control units or wireless amplifiers, but these are only provided for the purpose of illustration, but not intended for limiting the scope of the present disclosure. In an embodiment, the present disclosure enables the users to activate an auxiliary wizard program through the device and on the webpage or mobile application, in order to carry out the steps interactively, automatically, or semi-automatically, so as to achieve the effect of creating the IPv6 environment and the IPv4aaS environment. With reference to the FIGURE for the method of the present disclosure, the method includes the steps of:

After the present disclosure is activated, the step (S101) will be executed first, and the main purpose is to check whether the Wide Area Network (WAN) side of a customer premise equipment is under the PPPoE environment, so that an activation packet such as a PPPoE active discovery initiation (PADI) packet is sent out from the WAN side of the customer premise equipment. When a response packet (PP-PoE Active Discovery Offer, PADO) is received, it means that the Internet service provider provides a PPPoE line. The users are directed to enter the connection information of the PPPoE, are reminded to enter the PPPoE account, password and service name provided by the Internet service provider on the user interface, in order to fully establish the PPPoE connection and try to make a handshake of the IPv6 Control Protocol (IPV6CP) with the PPPoE server of the Internet service provider. At this time, the customer premise equipment will exchange the configuration request of the IPV6CP with the PPPoE server through the recently established PPPoE connection.

After a PPPoE server acknowledgement response is received, an interface identifier required for the link-local address is obtained. If the PPPoE server configuration acknowledgement is not obtained or a protocol reject or a configuration reject is received, it will be regarded as a failure of the IPv6CP handshake process, the current IPv6 environment will be determined as IPoE, and thus will disconnect the aforementioned PPPoE connection and proceed to the next step.

In the step (S102), based on the IPv6CP establishment result of the previous step, it will decide whether or not the subsequent IPv6 packet needs to be over the PPPoE session. Therefore, this step will send a router solicitation (RS) packet on the WAN side first in order to obtain the router advertisement (RA) of a network gateway, and synchronously activate the DHCPv6 client. The basic settings required for obtaining the IPv6 environment through the router advertisement and the DHCPv6 process include default gateway, IPv6 address, DHCPv6 Prefix Delegation (DHCP-PD), and DNS address. In the DHCPv6 solicit message transmitted in this step, the settings of DHCPv6 S46 such as the Dual Stack Lite Address Family Transition Router (DS-Lite AFTR) name setting, the DHCPv4-to-DHCPv6 conversion setting, the Mapping of Address and Port with Encapsulation (MAP-E) container option, the Mapping of Address and Port using Translation (MAP-T) container option, the lightweight 4over6 container option, the S46 priority option will be solicited in the option request option (ORO) field, which will be used as the required information by the S46 mechanism in the subsequent steps.

In the step (S103), it will check whether the DHCP-PD length obtained from the DHCPv6 server of the Internet service provider is smaller than or equal to 64 (such as 63, 62, . . . , etc.). If the DHCP-PD length is smaller than or equal to 64, then it may distribute this prefix to a local area network (LAN) side to facilitate the users to generate the corresponding IPv6 address, and then enter into the step (S105) to execute a distribution process. On the other hand, if the DHCP-PD length is greater than 64, or cannot be obtained, the prefix length is insufficient to be distributed to the LAN side, so that it will enter into the step (S104) to carry out a backup plan.

If the customer premise equipment cannot obtain the DHCP-PD with a prefix length smaller than or equal to 64 from the Internet service provider and the step (S104) is executed, and the WAN side is under the PPPoE environment, the client router on the WAN side will maintain a peer-to-peer PPPoE connection, and directly configure the network gateway through the prefix provided by the router advertisement to the LAN side, so as to ensure that the user's IPv6 address can be generated. If the WAN side is under the IPOE environment, since the WAN side is not under the environment of a peer-to-peer connection, the prefix provided by the RA must be provided for the use by the WAN side, therefore the client router will activate a Neighbor Discovery Proxy (ND Proxy) to allow the LAN side and the WAN side to share the prefix provided by this router advertisement. After the client router completes the above-mentioned steps, it will enter into the step (S105) to complete the subsequent IPv6 network configuration.

In the step (S105), the prefix collected in the step (S103) or (S104) will be distributed to the user. In the distribution process, if the prefix length of the DHCP-PD is equal to 64, then the prefix with the length equal to 64 will be provided to the LAN user; and if the prefix length of the DHCP-PD is smaller than 64, then two prefixes with the length equal to 64 will be provided to the LAN user and the guest user of the LAN side respectively.

If the prefix length of the DHCP-PD is smaller than 63, then after the aforementioned distribution process is completed, then the prefix length of the remaining prefix will be distributed to the LAN user router, based on the following Table 1 of the DHCP-PD to the customer premise equipment of the LAN after the distribution process, so that the LAN user of the customer premise equipment can obtain the IPv6 address.

TABLE 1

| The prefix length obtained from the network provider: N | The prefix length distributed to LAN side customer premise equipment: X |
| --- | --- |
| N ≤ 56 | X = (N + 4) |
| 57 ≤ N ≤ 59 | X = (N + 3) |
| 60 ≤ N ≤ 61 | X = (N + 2) |
| N = 62 | X = 63 |
| N ≥ 63 | None |

After the foregoing steps are completed, a prefix distribution process is executed. This process defines the customer premise equipment as a parent customer premise equipment of the prefix. After the child customer premise equipment of the LAN side obtains the DHCP-PD from the parent customer premise equipment, the parent customer premise equipment creates a routing for the child customer premise equipment and points the distributed prefix to the child customer premise equipment, and deletes the routing when the child customer premise equipment releases the prefix, or when the prefix expires. In the meanwhile, if the prefix obtained by the child customer premise equipment side is smaller than 63, then this customer premise equipment can be defined as the parent customer premise equipment of the prefix, and the prefix distribution process is repeated to form an hierarchical distribution prefix architecture, until the DHCP-PD prefix received by the child customer premise equipment is greater than or equal to 63.

In the Step (S106), the S46 option of the DHCPv6 collected from the DHCPv6 server of the Internet service provider is compiled. Firstly, the priority order of building the S46 mechanism is determined according to a S46 priority option. In a specific embodiment, the S46 mechanism of the first priority is checked whether the corresponding S46 container option exist, and if the S46 container option does not exist or the content is illegitimate, the S46 mechanism of the second priority will be checked, until the legitimate and highest-priority S46 container option is found. If the S46 container option cannot be found, then it will be selected according to the sequence of MAP-E, MAP-T, Lightweight 4over6, and DS-Lite. In the above process, if any S46 mechanism to be built can be found, then it will go to the next step (S107), or else go to the step (S108).

In the step (S107), the S46 mechanism is constructed according to the S46 container option selected in the step (S106), and the S46 mechanism must be one of the DS-Lite (RFC6333), DHCPv4 over DHCPv6 (RFC7341), MAP-E (RFC7597), MAP-T (RFC7599), and Lightweight 4over6 (RFC7596). After the construction, the IPv4 address is distributed via the DHCPv4 server to the LAN user, the client router will present this IPv4 address in IPv6 address through the tunneling or translation, depending on the selected S46 mechanism, so that the users can use the IPv4 address to pass through the IPv6 network to get the IPv4 service. The whole process will end after this step is completed.

In the Step (S108), if an appropriate S46 container option cannot be found in the step (S106), then it will execute the step of searching for the possibility of creating a 464XLAT, and following the sequence of the Port Control Protocol (RFC7225), Router Advertisements Option (RFC8781) and IPv6 Address Synthesis (RFC7050) to search for a PREF64. If a legitimate PREF64 can be found, then it will go to the step (S109), or else it means that there is no suitable IPv4 transition mechanism at the moment, and ends the process.

In the step (S109), the customer premise equipment plays the role of a customer-side translator (CLAT) in the RFC6877, obtains PREF64 in the step (S108), converts the IPv4 packet of the LAN user into the IPv6 packet, and transmits it to the IPv6 network, and vice versa. When the destination address of the received IPv6 packet is PREF64, the IPv6 packet will be converted into the IPv4 packet, and will transmit it to the IPv4 user of the LAN side to end the whole procedure after this step is completed.

The present disclosure creates an auxiliary wizard program and enables the users to activate the auxiliary wizard program to quickly complete an IPv6 network construction, and construct an appropriate IPv4aaS architecture according to the DHCPv6 option or RA option provided by the Internet service provider after confirming the IPv6 network construction. By the technique of packeting the IPv4 or converting it into the IPv6, so that the application program only supporting the IPv4 protocol can also perform transmission via the IPv6 network to achieve the effects of lowering the technical threshold for users to construct the IPv6, improving the users' configuration experience, and enhancing the popularity of the IPv6.

What is claimed is:

1. An automatic detection and network construction method based on IPv6 protocol, comprising:

sending an activation packet from a Wide Area Network (WAN) side of a customer premise equipment and recognizing that an Internet service provider provides a PPPoE line upon receipt of a response packet, and directing a user to input connection information with respect to the PPPoE line to establish a PPPoE connection, and making a handshake of an IPv6 Control Protocol (IPV6CP) with a PPPoE server of the Internet service provider; and exchanging a configuration request of the IPV6CP with the PPPoE server through the PPPoE connection established by the customer premise equipment, and either of generating an interface identifier required by a link-local address when receiving a PPPoE server acknowledgement response or determining that a current IPv6 environment is IPoE responsive to not receiving a PPPoE server response.

2. The automatic detection and network construction method based on the IPv6 protocol according to claim 1, further comprising:

checking whether a DHCPv6 Prefix Delegation length (DHCP-PD length) obtained by a DHCPv6 server of the Internet service provider is smaller than or equal to 64 and directly distributing a network prefix advertised by a gateway router through a router advertisement (RA) to a LAN side if the DHCP-PD length is greater than 64 or the DHCP-PD length cannot be obtained and the WAN side is under a PPPoE environment, thereby the user being able to generate an IPv6 address; or activating a Neighbor Discovery Proxy (ND Proxy) by a client router if the WAN side is under an IPoE environment, thereby the LAN side and the WAN side being able to share the network prefix.

3. The automatic detection and network construction method based on the IPv6 protocol according to claim 1, further comprising:

checking whether a DHCPv6 Prefix Delegation length (DHCP-PD length) obtained by a DHCPv6 server of the Internet service provider is smaller than or equal to 64 and responsively executing a distribution process selectively; and providing a prefix with a DHCP-PD length equal to 64 to a LAN user in the distribution process if the DHCP-PD length is equal to 64, or reserving two prefixes with a length equal to 64 to the LAN user and a LAN side guest user, respectively, in the distribution process if the DHCP-PD length is smaller than 64.

4. The automatic detection and network construction method based on the IPv6 protocol according to claim 3, further comprising: providing a remaining prefix to a LAN customer premise equipment based on following Table 1 after the distribution process, and if the DHCP-PD length is smaller than 63, thereby a LAN user of the customer premise equipment obtains the IPv6 address;

TABLE 1

| Prefix length obtained from the network provider: N | Prefix length distributed to LAN side customer premise equipment: X |
|---|---|
| N ≤ 56 | X = (N + 4) |
| 57 ≤ N ≤ 59 | X = (N + 3) |//

TABLE 1-continued

| Prefix length obtained from the network provider: N | Prefix length distributed to LAN side customer premise equipment: X |
|---|---|
| 60 ≤ N ≤ 61 | X = (N + 2) |
| N = 62 | X = 63 |
| N ≥ 63 | None. |

5. The automatic detection and network construction method based on the IPv6 protocol according to claim 4, further comprising a prefix distribution process, wherein the prefix distribution process includes:

defining the customer premise equipment as a parent customer premise equipment subsequent to a child customer premise equipment of the LAN side obtaining a DHCP-PD from the parent customer premise equipment, generating a routing for the child customer premise equipment by the parent customer premise equipment and pointing a distributed prefix to the child customer premise equipment, and either of releasing the distributed prefix at the child customer premise equipment or deleting the routing when the distributed prefix expires.

6. The automatic detection and network construction method based on the IPv6 protocol according to claim 5, wherein the prefix distribution process further comprises:

defining the child customer premise equipment as the parent customer premise equipment of the prefix, and if the DHCP-PD length obtained by the child customer premise equipment is smaller than 63, and repeating the prefix distribution process until the DHCP-PD length of the child customer premise equipment is greater than or equal to 63.

7. The automatic detection and network construction method based on the IPv6 protocol according to claim 1, further comprising:

collecting a S46 option of a DHCPv6 by a DHCPv6 server of the Internet service provider;

selectively generating a priority order of a S46 mechanism according to a S46 priority option; and determining a highest priority and determining whether the S46 mechanism existed in a legitimate S46 container option, and attempting to obtain a PREF64 and establishing a connection to a 464XLAT if the S46 mechanism cannot be generated.

8. The automatic detection and network construction method based on the IPv6 protocol according to claim 7, wherein when the S46 mechanism cannot be generated, the PREF64 is obtained according to a sequence of a Port Control Protocol (RFC7225), a Router Advertisements Option (RFC8781), and a IPv6 Address Synthesis (RFC7050).

9. The automatic detection and network construction method based on the IPv6 protocol according to claim 1, wherein steps of the method are executed interactively, automatically, or semi-automatically, by an auxiliary wizard program.

10. An automatic detection and network construction system based on IPv6 protocol, comprising:

at least one storage device equipment for storing an instruction; and a processor equipment for executing the instruction to implement the automatic detection and network construction method based on the IPv6 protocol according to claim 1.

11. The automatic detection and network construction method based on the IPv6 protocol according to claim 1, wherein the connection information for establishing a PPPoE connection includes:
- a username, wherein the username identifies the user of the PPPoE connection;
- a password, wherein the password is authenticated by the PPPoE server; and
- a PPPoE service name, wherein the service name is used to specify a particular PPPoE service provided by an Internet Service Provider (ISP) when multiple services are available, thereby assisting the PPPoE server in determining an appropriate connection.

* * * * *